United States Patent
Podrebarac et al.

(10) Patent No.: US 8,486,258 B2
(45) Date of Patent: Jul. 16, 2013

(54) GASOLINE HYDRODESULFURIZATION AND MEMBRANE UNIT TO REDUCE MERCAPTAN TYPE SULFUR

(75) Inventors: Gary G. Podrebarac, Houston, TX (US); Raymond Chafin, Houston, TX (US)

(73) Assignee: Catalytic Distillation Technologies, Pasadena, TX (US)

( * ) Notice: Subject to any disclaimer, the term of this patent is extended or adjusted under 35 U.S.C. 154(b) by 542 days.

(21) Appl. No.: 12/752,353

(22) Filed: Apr. 1, 2010

(65) Prior Publication Data

US 2011/0240518 A1  Oct. 6, 2011

(51) Int. Cl.
*C10G 31/09* (2006.01)
*C10G 45/02* (2006.01)

(52) U.S. Cl.
USPC ....... 208/208 R; 208/177; 208/209; 208/210; 208/212; 208/308

(58) Field of Classification Search
USPC ............................................ 208/208 R, 210
See application file for complete search history.

(56) References Cited

U.S. PATENT DOCUMENTS

| | | | |
|---|---|---|---|
| 2,793,170 A | 5/1957 | Stiles et al. |
| 4,397,739 A | 8/1983 | Jacquin et al. |
| 4,731,229 A | 3/1988 | Sperandio |
| 5,073,236 A | 12/1991 | Gelbein et al. |
| 5,266,546 A | 11/1993 | Hearn |
| 5,320,742 A | 6/1994 | Fletcher et al. |
| 5,431,890 A | 7/1995 | Crossland et al. |
| 5,491,890 A | 2/1996 | Dowell et al. |
| 5,595,643 A | 1/1997 | Torimoto et al. |
| 5,597,476 A | 1/1997 | Hearn et al. |
| 5,730,843 A | 3/1998 | Groten et al. |
| 5,779,883 A | 7/1998 | Hearn et al. |
| 5,837,130 A | 11/1998 | Crossland |
| 6,083,378 A | 7/2000 | Gildert et al. |
| 6,303,020 B1 | 10/2001 | Podrebarac et al. |
| 6,409,913 B1 | 6/2002 | Clark et al. |
| 6,416,658 B1 | 7/2002 | Maraschino et al. |
| 6,444,118 B1 | 9/2002 | Podrebarac et al. |
| 6,495,030 B1 | 12/2002 | Podrebarac |
| 6,649,061 B2 | 11/2003 | Minhas et al. |

(Continued)

OTHER PUBLICATIONS

Orme, C., et al., Mixed Gas Hydrogen Sulfide Permeability and Separation Using Supported Polyphosphazene Membranes, Journal of Membrand Science, 2005, vol. 253, pp. 243-249.*

(Continued)

*Primary Examiner* — Walter D. Griffin
*Assistant Examiner* — Derek Mueller
(74) *Attorney, Agent, or Firm* — Osha • Liang LLP

(57) ABSTRACT

A process for the hydrodesulfurization of gasoline is disclosed, the process including: feeding (1) a cracked naphtha containing mercaptans and other organic sulfur compounds and (2) hydrogen to a first hydrodesulfurization reactor containing one or more beds of a hydrodesulfurization catalyst; contacting sulfur compounds comprising the other organic sulfur compounds in the cracked naphtha with hydrogen in the presence of a hydrodesulfurization catalyst to convert a portion of the other organic sulfur compounds to hydrogen sulfide; withdrawing from the hydrodesulfurization reactor an effluent comprising hydrocarbons and hydrogen sulfide. The effluent from the hydrodesulfurization reactor is fed to a membrane separation system containing a membrane for partitioning the hydrocarbons from the hydrogen sulfide. For example, the membrane may be selective to hydrogen sulfide, to separate a permeate fraction comprising hydrogen sulfide from a residue fraction comprising the hydrocarbons.

27 Claims, 9 Drawing Sheets

U.S. PATENT DOCUMENTS

| | | | |
|---|---|---|---|
| 6,678,830 | B1 | 1/2004 | Mustafa et al. |
| 6,824,679 | B1 | 11/2004 | Dzengeleski et al. |
| 7,261,809 | B2 * | 8/2007 | Bakshi .......................... 208/210 |
| 7,267,761 | B2 | 9/2007 | Balko |
| 2005/0067323 | A1 * | 3/2005 | Balko ....................... 208/208 R |
| 2010/0264065 | A1 | 10/2010 | Hamad et al. |

OTHER PUBLICATIONS

International Search Report and Written Opinion dated Nov. 17, 2011 issued by the PCT in corresponding International application No. PCT/US2011/028818 (11 pages).

"Temperature and pressure effects on CO2 and CH4 permeation through MFI zeolite membranes"; Joseph C. Poshusta et al.; Journal of Membrane Science 160 (1999); pp. 115-125.

"Separation of C6 isomers by vapor permeation and pervaporation through ZSM-5 membranes"; Catherine L. Flanders et al.; Journal of Membrane Science 176 (2000); pp. 43-53.

"Upgrading low-quality natural gas with H2S- and CO2-selective polymer membranes..."; J. Hao et al.; Journal of Membrane Science 209 (2002); pp. 177-206.

"SAPO-34 membranes for CO2/CH4 separation"; Shiguang Li et al.; Journal of Membrane Science 241 (2004); pp. 121-135.

"Preparation, characterization and gas permeation properties of carbon hollow fiber membranes based on Matrimida 5218 precursor"; E.P. Favvas et al.; Journal of Materials Processing Technology 186 (2007); pp. 102-110.

Notification Concerning Transmittal of International Preliminary Report on Patentability dated Oct. 11, 2012 in corresponding International application No. PCT/US2011/028818 (8 pages).

* cited by examiner

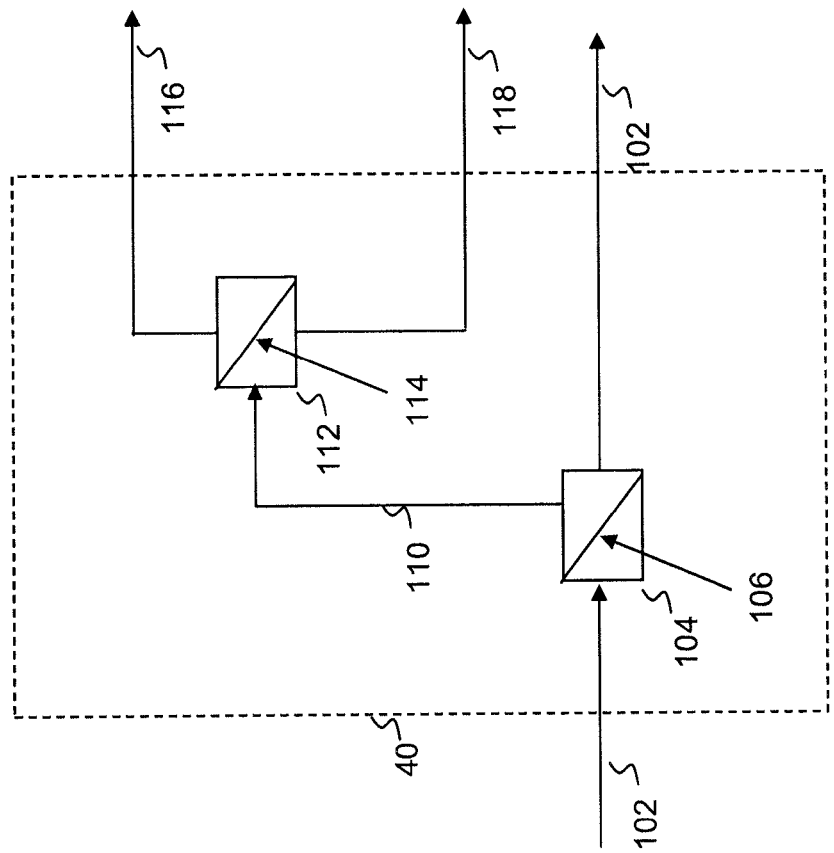
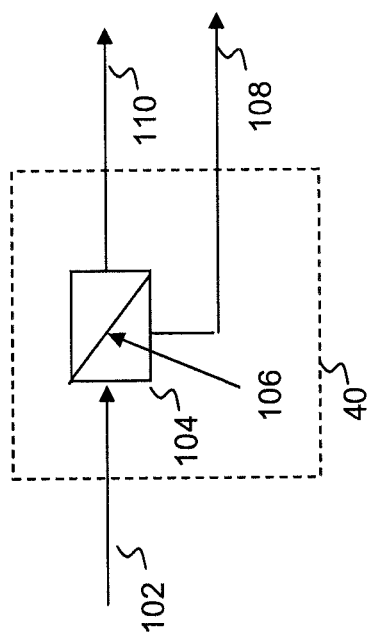

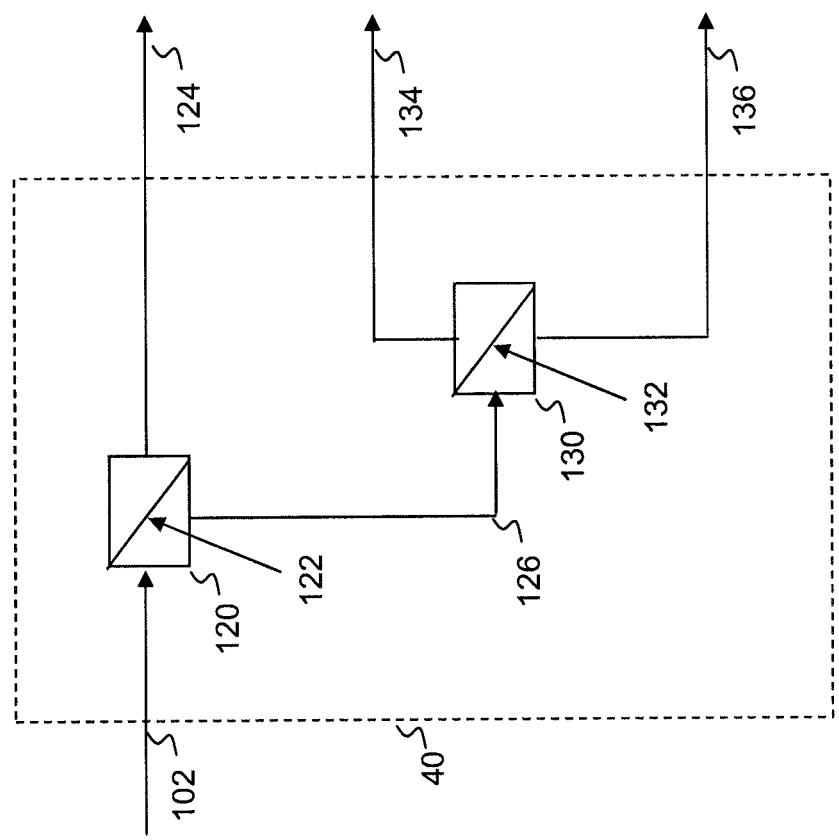

GASOLINE HYDRODESULFURIZATION AND MEMBRANE UNIT TO REDUCE MERCAPTAN TYPE SULFUR

FIELD OF THE DISCLOSURE

Embodiments disclosed herein generally relate to a process for the reduction of sulfur content in gasoline range hydrocarbons. More particularly, embodiments disclosed herein relate to hydrodesulfurization processes including one or more membrane separation systems to selectively reduce concentration of hydrogen sulfide at select portions of the process. More particularly, embodiments disclosed herein relate to hydrodesulfurization processes that may reduce the formation of recombinant mercaptans through the use of membrane separation systems.

BACKGROUND

Petroleum distillate streams contain a variety of organic chemical components. Generally the streams are defined by their boiling ranges, which determine the composition. The processing of the streams also affects the composition. For instance, products from either catalytic cracking or thermal cracking processes contain high concentrations of olefinic materials as well as saturated (alkanes) materials and poly-unsaturated materials (diolefins). Additionally, these components may be any of the various isomers of the compounds.

The composition of untreated naphtha as it comes from the crude still, or straight run naphtha, is primarily influenced by the crude source. Naphthas from paraffinic crude sources have more saturated straight chain or cyclic compounds. As a general rule most of the "sweet" (low sulfur) crudes and naphthas are paraffinic. The naphthenic crudes contain more unsaturates, cyclic, and polycylic compounds. The higher sulfur content crudes tend to be naphthenic. Treatment of the different straight run naphthas may be slightly different depending, upon their composition due to crude source.

Reformed naphtha or reformate generally requires no further treatment except perhaps distillation or solvent extraction for valuable aromatic product removal. Reformed naphthas have essentially no sulfur contaminants due to the severity of their pretreatment for the process and the process itself.

Cracked naphtha, as it comes from the catalytic cracker, has a relatively high octane number as a result of the olefinic and aromatic compounds contained therein. In some cases, this fraction may contribute as much as half of the gasoline in the refinery pool together with a significant portion of the octane.

Catalytically cracked naphtha gasoline boiling range material currently forms a significant part (~⅓) of the gasoline product pool in the United States and is the cause of the majority of the sulfur found in gasoline. These sulfur impurities may require removal in order to comply with product specifications or to ensure compliance with environmental regulations, which may be as low as 10, 20 or 50 wppm, depending upon the jurisdiction.

The most common method of removal of the sulfur compounds is by hydrodesulfurization (HDS) in which the petroleum distillate is passed over a solid particulate catalyst comprising a hydrogenation metal supported on an alumina base. Additionally, large amounts of hydrogen are included in the feed. The hydrodesulfurization reaction results in the production of hydrogen sulfide according to the following reaction: $RSH + H_2 \leftrightarrow R' + H_2S$. Typical operating conditions for standard single pass fixed bed HDS reactors, such as in a trickle bed reactor, are temperatures ranging from 600° F. to 780° F., pressures ranging from 600 to 3000 psig, hydrogen recycle rates ranging from 500 to 3000 scf/bbl, and fresh hydrogen makeup ranging from 100 to 1000 scf/bbl.

After the hydrotreating is complete, the product may be fractionated or simply flashed to release the hydrogen sulfide and collect the desulfurized naphtha. In addition to supplying high octane blending components the cracked naphthas are often used as sources of olefins in other processes such as etherifications, oligomerizations, and alkylations. The conditions used to hydrotreat the naphtha fraction to remove sulfur will also saturate some of the olefinic compounds in the fraction, reducing the octane and causing a loss of source olefins. The loss of olefins by incidental hydrogenation is detrimental, reducing the octane rating of the naphtha and reducing the pool of olefins for other uses.

Various proposals have been made for removing sulfur while retaining the more desirable olefins. Because the olefins in the cracked naphtha are mainly in the low boiling fraction of these naphthas and the sulfur containing impurities tend to be concentrated in the high boiling fraction, the most common solution has been prefractionation prior to hydrotreating. The prefractionation produces a light boiling range naphtha which boils in the range of $C_5$ to about 150° F. and a heavy boiling range naphtha which boils in the range of from about 250-475° F.

The predominant light or lower boiling sulfur compounds are mercaptans while the heavier or higher boiling compounds are thiophenes and other heterocyclic compounds. The separation by fractionation alone will not remove the mercaptans. However, in the past the mercaptans have been removed by oxidative processes involving caustic washing. A combination of oxidative removal of the mercaptans followed by fractionation and hydrotreating of the heavier fraction is disclosed in U.S. Pat. No. 5,320,742. In the oxidative removal of the mercaptans the mercaptans are converted to the corresponding disulfides.

Several U.S. patents describe the concurrent distillation and desulfurization of naphtha, including U.S. Pat. Nos. 5,597,476; 5,779,883; 6,083,378; 6,303,020; 6,416,658; 6,444,118; 6,495,030; 6,678,830 and 6,824,679. In each of these patents, the naphtha is split into two or three fractions based upon boiling point or boiling ranges.

An additional problem encountered during hydrodesulfurization is the reaction of hydrogen sulfide with olefins to form what are called recombinant mercaptans:

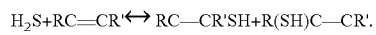

$H_2S + RC=CR' \leftrightarrow RC-CR'SH + R(SH)C-CR'$.

The formation of mercaptans during the hydrodesulfurization of FCC gasoline is well known to occur, as disclosed in U.S. Pat. No. 2,793,170. Recombinant mercaptans may form due to the relatively high concentration of hydrogen sulfide in the flash or overhead system (compared to the concentration of hydrogen sulfide within a reactive distillation column). A very important consideration in hydrodesulfurization designs is managing the amount of these recombinant mercaptans in the product.

U.S. Pat. No. 6,409,913 discloses a process to desulfurize naphtha by reacting a naphtha feed containing sulfur compounds and olefins with hydrogen in the presence of a hydrodesulfurization catalyst. As described therein, reduced recombinant mercaptan formation may be achieved at specific conditions of high temperature, low pressure, and high treat gas ratio. Although not discussed in relation to the desired high temperature, vaporization of FCC streams may result in plugging of heat exchangers and flow lines due to the polymerization of olefins, as described in U.S. Pat. No. 4,397,739.

U.S. Pat. No. 6,416,658 a full boiling range naphtha stream is subjected to simultaneous hydrodesulfurization and splitting into a light boiling range naphtha and a heavy boiling range naphtha followed by a further hydrodesulfurization by contacting the light boiling range naphtha with hydrogen in countercurrent flow in a fixed bed of hydrodesulfurization catalyst to remove recombinant mercaptans which are formed by the reverse reaction of $H_2S$ with olefins in the naphtha during the initial hydrodesulfurization. In particular the entire recovered portion of the light naphtha from a reaction distillation column hydrodesulfurization is further contacted with hydrogen in countercurrent flow in a fixed bed of hydrodesulfurization catalyst.

Accordingly, there exists a need for processes for the hydrodesulfurization of FCC gasoline which minimizes or controls the formation of recombinant mercaptans, resulting in a hydrocarbon stream of reduced organic sulfur content.

SUMMARY OF CLAIMED EMBODIMENTS

In one aspect, embodiments disclosed herein relate to a process for the hydrodesulfurization of gasoline, the process including: feeding (1) a cracked naphtha containing mercaptans and other organic sulfur compounds and (2) hydrogen to a first hydrodesulfurization reactor containing one or more beds of a hydrodesulfurization catalyst; contacting sulfur compounds comprising the other organic sulfur compounds in the cracked naphtha with hydrogen in the presence of a hydrodesulfurization catalyst to convert a portion of the other organic sulfur compounds to hydrogen sulfide; withdrawing from the hydrodesulfurization reactor an effluent comprising hydrocarbons, hydrogen sulfide, and optionally hydrogen; and feeding the effluent to a membrane separation system containing a membrane for separating at least a portion of the hydrogen sulfide from the hydrocarbons to recover a hydrocarbon fraction having a reduced hydrogen sulfide content.

In another aspect, embodiments disclosed herein relate to a process for the hydrodesulfurization of gasoline including the steps of: feeding (1) a cracked naphtha containing mercaptans and other organic sulfur compounds and (2) hydrogen to a first catalytic distillation reactor system having one or more reaction zones containing a hydrodesulfurization catalyst; concurrently in the catalytic distillation reactor system, (i) reacting at least a portion of the mercaptans and other organic sulfur compounds in the cracked naphtha with hydrogen in the presence of the hydrodesulfurization catalyst to convert a portion of the mercaptans and other organic sulfur compounds to hydrogen sulfide, and (ii) separating the cracked naphtha into a light naphtha fraction and a heavy naphtha fraction; recovering the light naphtha fraction, unreacted hydrogen, and hydrogen sulfide from the catalytic distillation reactor system as an overheads vapor fraction; recovering the heavy naphtha fraction from the catalytic distillation reactor system as a bottoms fraction; feeding at least a portion of a vapor draw comprising hydrocarbons, hydrogen sulfide, and optionally hydrogen from the catalytic distillation reactor system, inclusive of the overheads vapor fraction, to a membrane separation system containing a membrane for separating at least a portion of the hydrogen sulfide from the hydrocarbons to recover a hydrocarbon fraction having a reduced hydrogen sulfide content.

In another aspect, embodiments disclosed herein relate to a process for the hydrodesulfurization of gasoline including the steps of: feeding (1) a full boiling range cracked naphtha containing olefins, diolefins, mercaptans and other organic sulfur compounds and (2) hydrogen to a first catalytic distillation reactor system; concurrently in the first catalytic distillation reactor system, (i) contacting the diolefins and the mercaptans in the cracked naphtha in the presence of a Group VIII metal catalyst in the rectification section of the first catalytic distillation reactor system thereby reacting: (A) a portion of the mercaptans with a portion of the diolefins to form thioethers, (B) a portion of the mercaptans with a portion of the hydrogen to form hydrogen sulfide; or (C) a portion of the dienes with a portion of the hydrogen to form olefins; and (D) a combination of one or more of (A), (B), and (C); and (ii) fractionating the full boiling range cracked naphtha into a distillate product containing C5 hydrocarbons and a first heavy naphtha containing sulfur compounds; recovering the first heavy naphtha from the first catalytic distillation reactor system as a first bottoms; feeding the first bottoms and hydrogen to a second catalytic distillation reactor system having one or more reaction zones containing a hydrodesulfurization catalyst; concurrently in the second catalytic distillation reactor system, (i) reacting at least a portion of the mercaptans and other organic sulfur compounds in the first bottoms with hydrogen in the presence of the hydrodesulfurization catalyst to convert a portion of the mercaptans and other organic sulfur compounds to hydrogen sulfide, and (ii) separating the first bottoms into a light naphtha fraction and a heavy naphtha fraction; recovering the light naphtha fraction, unreacted hydrogen, and hydrogen sulfide from the second catalytic distillation reactor system as an overheads vapor fraction; recovering the heavy naphtha fraction from the second catalytic distillation reactor system as a bottoms fraction; feeding at least a portion of a vapor draw comprising hydrocarbons, hydrogen sulfide, and optionally hydrogen from the second catalytic distillation reactor system, inclusive of the overheads vapor fraction, to a membrane separation system containing a membrane for separating at least a portion of the hydrogen sulfide from the hydrocarbons to recover a hydrocarbon fraction having a reduced hydrogen sulfide content.

In another aspect, embodiments disclosed herein relate to a process for the hydrodesulfurization of gasoline including the steps of: feeding (1) a cracked naphtha containing mercaptans and other organic sulfur compounds and (2) hydrogen to a first catalytic distillation reactor system having one or more reaction zones containing a hydrodesulfurization catalyst; concurrently in the catalytic distillation reactor system, (i) reacting at least a portion of the mercaptans and other organic sulfur compounds in the cracked naphtha with hydrogen in the presence of the hydrodesulfurization catalyst to convert a portion of the mercaptans and other organic sulfur compounds to hydrogen sulfide, (ii) separating the cracked naphtha into a light naphtha fraction and a heavy naphtha fraction; and (iii) contacting a portion of vapor comprising hydrocarbons, hydrogen, and hydrogen sulfide with a membrane separation system located within the column, the membrane separation system containing a membrane for separating at least a portion of the hydrogen sulfide from the hydrocarbons; recovering the light naphtha fraction, unreacted hydrogen, and hydrogen sulfide from the catalytic distillation reactor system as an overheads vapor fraction; recovering the heavy naphtha fraction from the catalytic distillation reactor system as a bottoms fraction; recovering a hydrogen sulfide fraction from the membrane separation system.

Other aspects and advantages of the invention will be apparent from the following description and the appended claims.

BRIEF DESCRIPTION OF DRAWINGS

FIGS. 1A-1C are simplified flow diagrams of membrane separation systems useful in embodiments disclosed herein.

DETAILED DESCRIPTION

Figure 1:
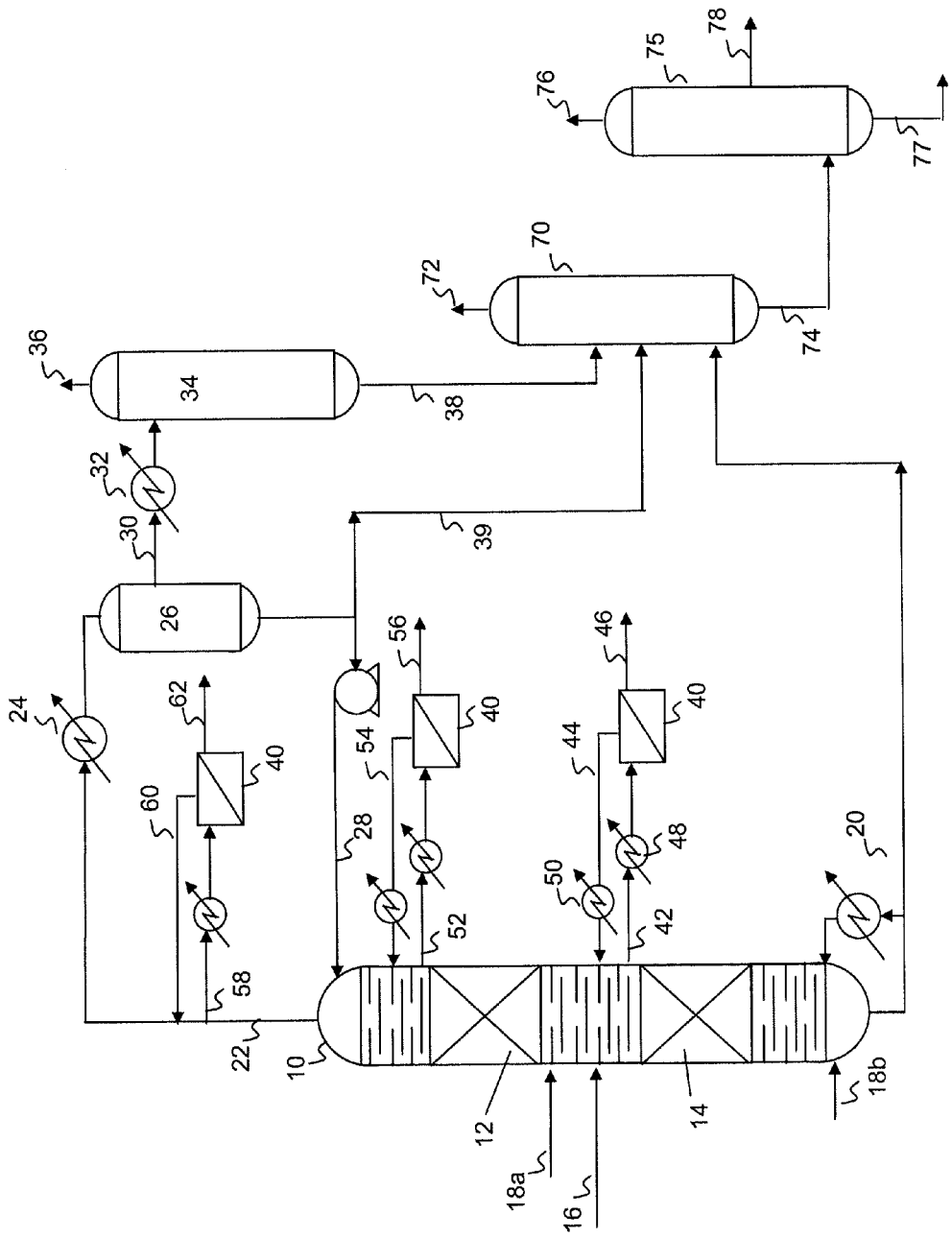
FIG. 1 is a simplified flow diagram of hydrodesulfurization processes according to embodiments disclosed herein.

"Recombinant mercaptans," as used herein, refers to mercaptans that are not in the feed to the present process but are the reaction products of the $H_2S$ generated by the hydrogenation of sulfur-containing compounds in the present process and alkenes in the feed. Thus, the recombinant mercaptans are not necessarily the same as those destroyed by the hydrodesulfurization of a first portion of the present process, although they may be. The present catalytic distillation hydrodesulfurization process is considered to dissociate substantially all of the mercaptans in the feed and the small amounts of mercaptans observed in the product streams are typically recombinant mercaptans. Although the catalytic distillation reaction is superior to the prior art straight hydrogenation for removing mercaptans, the dynamic system of catalytic distillation allows sufficient time for some undesirable recombination reactions to occur. Thus, in embodiments disclosed herein, the combination of a catalytic distillation hydrogenation reactor and a high temperature, low pressure hydrodesulfurization reactor is sufficient to dissociate recombinant mercaptans to result in a reduced overall sulfur content in the hydrocarbons being processed.

Within the scope of this application, the expression "catalytic distillation reactor system" denotes an apparatus in which the catalytic reaction and the separation of the products take place at least partially simultaneously. The apparatus may comprise a conventional catalytic distillation column reactor, where the reaction and distillation are concurrently taking place at boiling point conditions, or a distillation column combined with at least one side reactor, where the side reactor may be operated as a vapor phase reactor, a liquid phase reactor or a boiling point reactor, with concurrent or countercurrent vapor/liquid traffic. While both catalytic distillation reactor systems described may be preferred over conventional liquid phase reaction followed by separations, a catalytic distillation column reactor may have the advantages of decreased piece count, reduced capital cost, efficient heat removal (heat of reaction may be absorbed into the heat of vaporization of the mixture), and a potential for shifting equilibrium. Divided wall distillation columns, where at least one section of the divided wall column contains a catalytic distillation structure, may also be used, and are considered "catalytic distillation reactor systems" herein.

In one aspect, embodiments disclosed herein relate to a process for the reduction of sulfur content in gasoline range hydrocarbons. More particularly, embodiments disclosed herein relate to hydrodesulfurization processes including one or more membrane separation systems to selectively reduce concentration of hydrogen sulfide at select portions of the process. More particularly, embodiments disclosed herein relate to hydrodesulfurization processes that may reduce the formation of recombinant mercaptans through the use of membrane separation systems.

Hydrodesulfurization may be conducted according to embodiments disclosed herein using one or more catalytic distillation column reactors, and associated overheads systems, where membrane separation systems may be placed at select locations to reduce the concentration of hydrogen sulfide present in the vapor phase, thereby decreasing the amount of hydrogen sulfide available for the formation of recombinant mercaptans, and thereby reducing the sulfur concentration in the recovered hydrodesulfurized hydrocarbon products. In some embodiments, one or more membrane separation systems may be in fluid communication with the distillation column, removing hydrogen sulfide from a vapor draw, and returning hydrocarbon vapors to the column for further processing. In other embodiments, one or more membrane separation systems may be in fluid communication with the overheads system, such as the overhead vapor draw from the column or select vapor or liquid streams upstream of the hot and/or cold drums for separation of hydrogen and hydrogen sulfide from the overheads fraction.

Within the scope of this application, the expression "membrane separation system" denotes a system or apparatus that separates hydrogen sulfide from a hydrocarbon stream via a membrane. The feed to a membrane separation system according to embodiments disclosed herein may be liquid or vapor and is typically a vapor stream. Membrane separation systems useful in embodiments disclosed herein may include one or more membrane separation stages.

Membranes suitable for use in processes according to embodiments disclosed herein must be able to withstand the operating temperatures and pressures for hydrodesulfurization in a catalytic distillation column reactor system and the associated equipment. For example, operating conditions in catalytic distillation reactor systems according to embodiments disclosed herein may include temperatures in a range from about 300° F. to about 800° F. and pressures in a range from about 50 psig to about 400 psig.

There may be more than one membrane separation system used in the process, located in parallel or series to each other and at different stages of the process, as discussed below. By selectively removing hydrogen sulfide from the stripping or rectifying sections of a catalytic distillation reactor column, the mercaptan equilibrium shifts back to the olefin side of the reaction. The hydrocarbon product from the membrane separation system may be recycled back to the column and subjected to additional reaction in the presence of the reduced hydrogen sulfide concentration.

As noted above, the membrane separation system may be used to separate hydrogen sulfide from hydrocarbons. Membranes useful in embodiments disclosed herein may be selective toward the hydrocarbon, hydrogen, hydrogen sulfide, or a combination, such as to hydrogen and hydrogen sulfide. For example, in some embodiments, the membrane separation system may include a membrane for partitioning hydrogen from either or both hydrogen sulfide and hydrocarbons, a membrane for partitioning hydrogen and hydrogen sulfide from the hydrocarbons, a membrane for partitioning hydrocarbons from either or both hydrogen and hydrogen sulfide, or a combination thereof, where the membranes may be located in parallel or series. The membrane separation systems may also include compressors or other equipment to facilitate the desired fluid flow through the system, as necessary.

Depending on the selectivity of the membrane separations, hydrogen recovered from the membrane separation system may be recycled back to the column. The vapor draw feeding the membrane separation system may be heated or cooled, as necessary for the separation, and the vapor return to the column may be heated or cooled, as necessary for operation of the catalytic distillation reactor system. Further, more than one vapor draw may be used with more than one membrane separation system to provide further reduction in recombinant mercaptans within the catalytic distillation reactor column, as described above.

Membranes suitable for use at hydrodesulfurization reaction conditions (e.g., 300° F. to 800° F. at 50 to 400 psig pressure for a catalytic distillation reactor system) may be formed from several materials, such as a high performance polymeric material (*Journal of Membrane Science*, 202 (2002) 177-206), a carbon sieve type material (*Journal of Materials Processing Technology* 186 (2007) 102-110), and an inorganic sieve type material (*Journal of Membrane Science* 160 (1999) 115-125; *Journal of Membrane Science* 176 (2000) 43-53; *Journal of Membrane Science* 241 (2004) 121-135), for example. High performance polymers would include those with glass transition temperatures above the required operating temperatures, and are stable at the aforementioned operating conditions. These materials include, but are not limited to, polyimides, polyamides, polyamide-imides, and polysulfones, among others. A carbon sieve membrane would be any membrane where the selective layer is made of an amorphous carbon material, formed from various carbon precursors such as (but not limited to) the polymers mentioned above. Inorganic membrane materials can be any material such as a zeolite that has a regular pore structure and can separate molecules based on size selective diffusion or by preferential sorption. These materials may include, but are not limited to common zeolites such as ZSM-5, 4A, Y, and Beta, among others. Both carbon sieve membrane and inorganic sieve type membranes may be supported on a porous structure to allow for higher operating pressures and reduced selective layer thickness for increased flux.

The suitability of a particular membrane for use in embodiments disclosed herein may additionally depend upon the location of the membrane within the process. For example, a membrane located proximate the lower portion of a distillation column reactor system will be exposed to higher temperatures than a membrane located proximate the upper portion of a distillation column reactor. As another example, the suitability for membranes that selectively absorb hydrocarbons may also be affected by the particular location of the membrane separation system, as the hydrocarbons encountered by the membrane will also vary from the lower to the upper portion of the distillation column reactor system.

The hydrocarbon feed to the processes disclosed herein may be a sulfur-containing petroleum fraction which boils in the gasoline boiling range, including FCC gasoline, coker pentane/hexane, coker naphtha, FCC naphtha, straight run gasoline, pyrolysis gasoline, and mixtures containing two or more of these streams. Such gasoline blending streams typically have a normal boiling point within the range of 0° C. and 260° C., as determined by an ASTM D86 distillation. Feeds of this type include light naphthas typically having a boiling range of about $C_6$ to 165° C. (330° F.); full range naphthas, typically having a boiling range of about $C_5$ to 215° C. (420° F.), heavier naphtha fractions boiling in the range of about 125° C. to 210° C. (260° F. to 412° F.), or heavy gasoline fractions boiling in the range of about 165° C. to 260° C. (330° F. to 500° F.). In general, a gasoline fuel will distill over the range of from about room temperature to 260° C. (500° F.).

Organic sulfur compounds present in these gasoline fractions occur principally as mercaptans, aromatic heterocyclic compounds, and sulfides. Relative amounts of each depend on a number of factors, many of which are refinery, process and feed specific. In general, heavier fractions contain a larger amount of sulfur compounds, and a larger fraction of these sulfur compounds are in the form of aromatic heterocyclic compounds. In addition, certain streams commonly blended for gasoline, such as FCC feedstocks, contain high amounts of the heterocyclic compounds. Gasoline streams containing significant amounts of these heterocyclic compounds are often difficult to process using many of the prior art methods. Very severe operating conditions have been conventionally specified for hydrotreating processes to desulfurize gasoline streams, resulting in a large octane penalty. Adsorption processes, used as an alternative to hydrogen processing, have very low removal efficiencies, since the aromatic heterocyclic sulfur compounds have adsorptive properties similar to the aromatic compounds in the hydrocarbon matrix.

Aromatic heterocyclic compounds that may be removed by the processes disclosed herein include alkyl substituted thiophene, thiophenol, alkylthiophene and benzothiophene. Among the aromatic heterocyclic compounds of particular interest are thiophene, 2-methylthiophene, 3-methylthiophene, 2-ethylthiophene, benzothiophene and dimethylbenzothiophene. These aromatic heterocyclic compounds are collectively termed "thiophenes." Mercaptans that may be removed by the processes described herein often contain from 2-10 carbon atoms, and are illustrated by materials such as 1-ethanthiol, 2-propanethiol, 2-butanethiol, 2-methyl-2-propanethiol, pentanethiol, hexanethiol, heptanethiol, octanethiol, nonanethiol, and thiophenol.

Sulfur in gasoline originating from these gasoline streams may be in one of several molecular forms, including thiophenes, mercaptans and sulfides. For a given gasoline stream, the sulfur compounds tend to be concentrated in the higher boiling portions of the stream. Such a stream may be fractionated, and a selected fraction treated using the processes described herein. Alternatively, the entire stream may be treated using the processes described herein. For example, light gasoline streams that are particularly rich in sulfur compounds, such as coker pentane/hexane, may be suitably treated as a blend stream which also contains a higher boiling, lower sulfur containing component.

In general, gasoline streams suited for treatment using the processes disclosed herein contain greater than about 10 ppm thiophenic compounds. Typically, streams containing more than 40 ppm thiophenic compounds, up to 2000 ppm thiophenic compounds and higher may be treated using the processes as described herein. The total sulfur content of the gasoline stream to be treated using the processes disclosed herein will generally exceed 50 ppm by weight, and typically range from about 150 ppm to as much as several thousand ppm sulfur. For fractions containing at least 5 volume percent boiling over about 380° F. (over about 193° C.), the sulfur content may exceed about 1000 ppm by weight, and may be as high as 4000 to 7000 ppm by weight or even higher.

In addition to the sulfur compounds, naphtha feeds, including FCC naphtha, may include paraffins, naphthenes, and aromatics, as well as open-chain and cyclic olefins, dienes, and cyclic hydrocarbons with olefinic side chains. A cracked naphtha feed useful in the processes described herein may have an overall olefins concentration ranging from about 5 to 60 weight percent in some embodiments; from about 25 to 50 weight percent in other embodiments.

In general, systems described herein may treat a naphtha or gasoline fraction in one or more catalytic distillation reactor systems. Each catalytic distillation reactor system may have one or more reaction zones including a hydrodesulfurization catalyst. For example, reactive distillation zones may be contained within the stripping section, hydrodesulfurizing the heavier compounds, or within the rectification section, hydrodesulfurizing the lighter compounds, or both. Hydrogen may also be fed to the catalytic distillation reactor system, such as below the lowermost catalytic reaction zone, and in some embodiments, a portion of the hydrogen may be fed at multiple locations, including below each reaction zone.

In each catalytic distillation reactor system, the steps to catalytically react the naphtha feed with hydrogen may be carried out at a temperature in the range of 400° F. to 800° F. at 50 to 400 psig pressure with hydrogen partial pressure in the range of 0.1 to 100 psi at 20 to 1200 scf/bbl at weight hourly space velocities (WHSV) in the range of 0.1 to 10 $hr^{-1}$ based on feed rate and a particulate catalyst packaged in structures. If advanced specialty catalytic structures are used (where catalyst is one with the structure rather than a form of packaged pellets to be held in place by structure), the liquid hourly space velocity (LHSV) for such systems should be about in the same range as those of particulate or granular-based catalytic distillation catalyst systems as just referenced. As can be seen, the conditions suitable for the desulfurization of naphtha in a distillation column reactor system are very different from those in a standard trickle bed reactor, especially with regard to total pressure and hydrogen partial pressure. In other embodiments, conditions in a reaction distillation zone of a naphtha hydrodesulfurization distillation column reactor system are: temperatures in the range from 450° F. to 700° F., total pressure in the range from 75 to 300 psig, hydrogen partial pressure in the range from 6 to 75 psia, WHSV of naphtha in the range from about 1 to 5, and hydrogen feed rates in the range from 10 to 1000 scf/bbl.

The operation of a distillation column reactor results in both a liquid and a vapor phase within the distillation reaction zone. A considerable portion of the vapor is hydrogen, while a portion of the vapor is hydrocarbons from the hydrocarbon feed. In catalytic distillation it has been proposed that the mechanism that produces the effectiveness of the process is the condensation of a portion of the vapors in the reaction system, which occludes sufficient hydrogen in the condensed liquid to obtain the requisite intimate contact between the hydrogen and the sulfur compounds in the presence of the catalyst to result in their hydrogenation. In particular, sulfur species concentrate in the liquid while the olefins and $H_2S$ concentrate in the vapor, allowing for high conversion of the sulfur compounds with low conversion of the olefin species. The result of the operation of the process in the catalytic distillation reactor system is that lower hydrogen partial pressures (and thus lower total pressures) may be used, as compared to typical fixed bed hydrodesulfurization processes.

As in any distillation, there is a temperature gradient within the catalytic distillation reactor system. The lower end of the column contains higher boiling material and thus is at a higher temperature than the upper end of the column. The lower boiling fraction, which contains more easily removable sulfur compounds, is subjected to lower temperatures at the top of the column, which may provide for greater selectivity, that is, no hydrocracking or less saturation of desirable olefinic compounds. The higher boiling portion is subjected to higher temperatures in the lower end of the distillation column reactor to crack open the sulfur containing ring compounds and hydrogenate the sulfur. The heat of reaction simply creates more boil up, but no increase in temperature at a given pressure. As a result, a great deal of control over the rate of reaction and distribution of products can be achieved by regulating the system pressure.

A simplified flow diagram of a process for the hydrodesulfurization of cracked naphthas according to embodiments disclosed herein is illustrated in FIG. 1. In this embodiment, a catalytic distillation reactor system 10 is illustrated, which includes two reaction zones 12, 14 in the rectification section and the stripping section of the column, respectively. Naphtha and hydrogen may be introduced via flow lines 16 and 18a, 18b, respectively, to catalytic distillation reactor system 10. Heavy hydrocarbons contained in the naphtha traverse downward through the column, contacting a hydrodesulfurization catalyst contained in reaction zone 14 in the presence of hydrogen to hydrodesulfurize at least a portion of the organic sulfur compounds to form hydrogen sulfide. Similarly, light hydrocarbons contained in the naphtha traverse upward through the column, contacting a hydrodesulfurization catalyst contained in the rectification zone 12 in the presence of hydrogen to hydrodesulfurize at least a portion of the organic sulfur compounds to form hydrogen sulfide. A hydrodesulfurized heavy naphtha fraction may be withdrawn as a bottoms fraction from catalytic distillation reactor system 10 via flow line 20.

An overhead vapor fraction, including various hydrocarbons, unreacted hydrogen, and hydrogen sulfide, may be withdrawn from catalytic distillation column reactor 10 via flow line 22. The overhead vapor fraction may be partially condensed and separated from uncondensed vapors via cooler 24 and hot drum 26. A portion of the condensed hydrocarbons may be returned to catalytic distillation reactor system 10 as reflux via flow line 28. The uncondensed vapors recovered via flow line 30 may be further cooled, condensed, and separated, via heat exchanger 32 and cold drum 34. Hydrogen and hydrogen sulfide may be recovered from cold drum 34 via flow line 36, and a light naphtha fraction may be recovered via flow line 38.

As illustrated in FIG. 1, the heavy naphtha fraction recovered via flow line 20, condensate recovered from hot drum 26 via flow line 39 (the portion not used as reflux), and hydrocarbons recovered via flow line 38 from cold drum 34 are fed to stripper 70, to separate any dissolved or entrained hydrogen and hydrogen sulfide from the heavy and light naphtha fractions recovered via flow lines 20, 26, and 39, where the hydrogen and hydrogen sulfide may be recovered via flow line 72 and the combined naphtha fractions may be recovered via flow line 74. If desired, the combined hydrodesulfurized naphtha may be fed to a fractionation column 75 which may be used to fractionate the combined naphtha fractions into two or more desired fractions, such as into a light naphtha fraction 76, a heavy naphtha fraction 77, and if desired, an intermediate naphtha fraction 78.

Hydrogen sulfide vapors produced in reaction zone 14 typically traverse upward through catalytic distillation reactor system 10 and are available to form recombinant mercaptans in reaction zone 12. Hydrogen sulfide vapors produced in both reaction zone 12 and 14 typically continue to traverse upward through the catalytic distillation reactor system 10 and are available to form recombinant mercaptans in the overhead system components, including flow lines 22, 30, heat exchangers 24, 32, hot drum 26, and cold drum 34. Processes according to embodiments disclosed herein may include one or more membrane separation systems 40 to decrease the amount of hydrogen sulfide available for recombinant mercaptan formation.

Referring now to FIGS. 1A-1C, various membrane separation systems 40 useful in embodiments disclosed herein are illustrated. In FIG. 1A, for example, a hydrocarbon feed 102 may be fed to a membrane separation system 40 including a membrane separator 104 containing a membrane 106 for partitioning both hydrogen sulfide and hydrogen from the hydrocarbon. The hydrocarbon may then be recovered via flow line 108 and the hydrogen and hydrogen sulfide may be recovered via flow line 110, for further processing, separation and recycle of the hydrogen, or disposal. As illustrated in FIG. 1B, a two-stage membrane separation system 40 is illustrated, where the hydrogen and hydrogen sulfide stream 110 may be sent to a second membrane separator 112 containing a membrane 114 for partitioning hydrogen, recovered via flow line 116 from the hydrogen sulfide, recovered via flow line 118.

As illustrated in FIG. 1C, for example, the hydrocarbon feed 102 may be fed to a two-stage membrane separation system 40 including a first membrane separator 120 containing a membrane 122 for partitioning hydrogen, recovered via flow line 124, from hydrogen sulfide and hydrocarbons, recovered via flow line 126. The hydrocarbons and hydrogen sulfide may then be fed to a second membrane separator 130 containing a membrane 132 for selectively adsorbing hydrocarbons, resulting in a hydrocarbon stream 134, having a low hydrogen sulfide content, and a hydrogen sulfide waste stream 136. While only a limited number of membrane separation systems 40 are illustrated, numerous other flow schemes may be selected to effect the desired separation of hydrocarbons from hydrogen sulfide using the membranes as described above. The particular flow scheme selected may depend upon capital costs, operational considerations such as temperature and pressure requirements, desired purity of the recovered hydrogen, and waste disposal costs, among others.

Referring again to FIG. 1, the one or more membrane separation systems 40 may be located intermediate reactions zones 12, 14, above reaction zone 12, or in the column overhead system. For example, a vapor draw may be withdrawn via flow line 42 from a distillation tray above reaction zone 14 and below reaction zone 12. The vapor draw may then be fed to a membrane separation system 40 to separate hydrogen sulfide from hydrocarbon vapors, where the hydrocarbon vapors are returned to catalytic distillation reactor system 10 via flow line 44 and the hydrogen sulfide is recovered via flow line 46. To limit the amount of hydrogen sent to membrane separation system 40, hydrogen feed 18a may be to a tray above the vapor draw tray. If necessary, a cooler 48 may be used to cool the vapor draw prior to contact with the membrane in membrane separation system 40 and/or a heater 50 may be used to reheat the vapor prior to return to the column. In this manner, at least a portion of the hydrogen sulfide produced in reaction zone 14 may be removed prior to traversing upward into reaction zone 12, thereby reducing the amount of hydrogen sulfide available to form recombinant mercaptans in the upper portion of column 10 and the associated overheads system.

As another example, a vapor draw may be withdrawn via flow line 52 from a distillation tray above reaction zone 12. The vapor draw may then be fed to a membrane separation system 40 to separate hydrogen sulfide from hydrocarbon vapors, where the hydrocarbon vapors are returned to catalytic distillation reactor system 10 via flow line 54 and the hydrogen sulfide is recovered via flow line 56. In this manner, at least a portion of the hydrogen sulfide produced in one or both of reactions zones 12 and 14 may be separated from the hydrocarbons traversing upward through the column, thereby reducing the amount of hydrogen sulfide available to form recombinant mercaptans in the upper portion of column 10 and the associated overheads system.

As another example, the overhead fraction withdrawn via flow line 22, or a portion thereof, may be fed via flow line 58 to a membrane separation system 40 to separate hydrogen sulfide from hydrocarbon vapors, where the hydrocarbon vapors may be fed to cooler 24 or hot drum 26 via flow line 60 and the hydrogen sulfide may be recovered via flow line 62. In this manner, at least a portion of the hydrogen sulfide present in the overheads vapor draw may be separated from the hydrocarbons, thereby reducing the amount of hydrogen sulfide available to form recombinant mercaptans in the column 10 overhead system.

Using one or more membrane separation systems 40 may thus reduce the concentration of hydrogen sulfide being processed with the hydrocarbons in the upper portion of catalytic distillation reactor system 10 and in the associated overhead system. The reduced concentration of hydrogen sulfide may thus result in a light naphtha fraction recovered via flow line 38 having a lower concentration of mercaptan sulfur than a typical catalytic distillation reactor system and overheads system without a membrane separation system according to embodiments disclosed herein.

The vapor fractions recovered via flow lines 46, 56, and 62 may include hydrogen sulfide as well as hydrogen. As such, it may be desirable to recover the hydrogen for recycle and reuse. The hydrogen sulfide fractions recovered via one or more of flow lines 46, 56, 62 may be combined with the uncondensed vapors in flow line 30 or with the hydrogen/hydrogen sulfide vapors in flow line 36 for further processing, such as through a hydrogen sulfide scrubber or amine absorber (not shown) to separate the hydrogen from the hydrogen sulfide.

Catalytic distillation reactor systems 10 including one or more membrane separation systems 40, as described above for FIG. 1, may be used in combination with one or more fixed bed reactors or additional catalytic distillation reactor systems for hydrotreating a naphtha prior to or following catalytic distillation reactor system 10. For example: a fixed bed reactor may be used to hydrotreat the naphtha prior to feed to catalytic distillation reactor system 10 via flow line 16; a fixed bed reactor may be used to further hydrotreat the heavy naphtha fraction recovered via flow line 20; a fixed bed reactor may be used to further hydrotreat the light naptha fraction recovered via flow line 38; a catalytic distillation reactor system may be used to hydrotreat the naphtha fraction prior to feed to catalytic distillation reactor system 10 via flow line 16, where the naphtha hydrotreated may additionally be fractionated if desired, feeding only a heavier or lighter portion to catalytic distillation reactor system 10; a catalytic distillation reactor system may be used to hydrotreat the heavy naphtha fraction recovered via flow line 20; a catalytic distillation reactor system may be used to further hydrotreat the light naphtha fraction recovered via flow line 38; and combinations of these may also be used. Additionally, if an intermediate fraction is withdrawn from column 10 as a side draw, such as all or a portion of the hydrocarbons in flow line 44 or as a separate side draw fraction (not shown), this intermediate fraction may also be further hydrotreated using a fixed bed reactor or a catalytic distillation reactor system. Without limiting the scope of embodiments disclosed herein, various embodiments integrating a catalytic distillation reactor system 10 including one or more membrane separation systems 40 with one or more additional reactors for further hydrotreating the naphtha are illustrated in FIGS. 2-5, where like numerals represent like parts.

Figure 2:
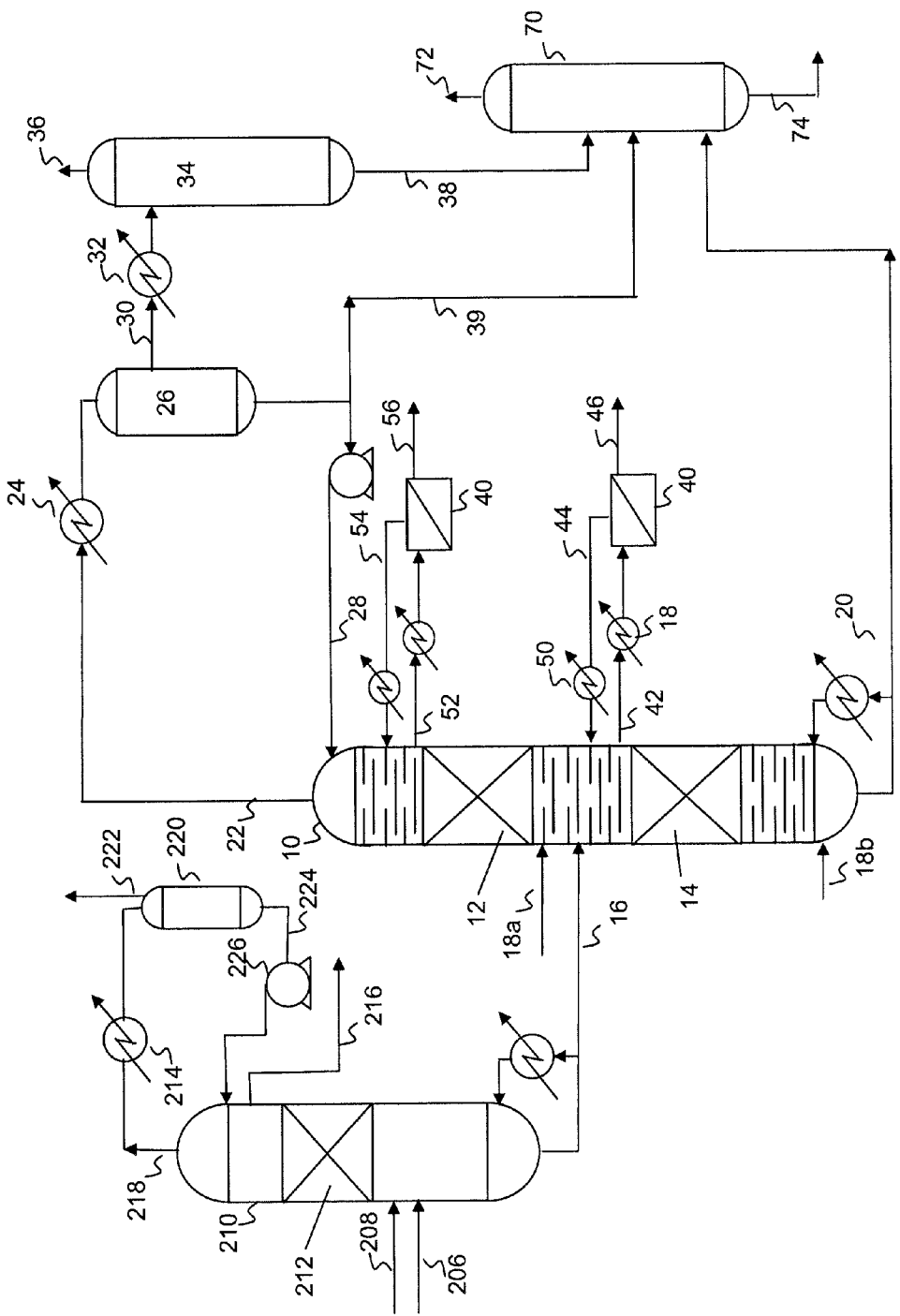
FIG. 2 is a simplified flow diagram of hydrodesulfurization processes according to embodiments disclosed herein.

Referring now to FIG. 2, a simplified flow diagram of a process for hydrodesulfurizing a hydrocarbon feed according to embodiments disclosed herein is illustrated, where like numerals represent like parts. In this embodiment, hydrogen and a naphtha or other organic sulfur-containing hydrocarbon feed may be fed via flow lines 206 and 208, respectively, to a first catalytic distillation reactor system 210 having one or more reactive distillation zones 212 for hydrotreating the hydrocarbon feed. As illustrated, catalytic distillation reactor system 210 includes at least one reactive distillation zone 212, located in an upper portion of the column, above the feed inlet, for treating the light hydrocarbon components in the feed.

Reaction zone 212 may include one or more catalysts for the hydrogenation of dienes, reaction of mercaptans and dienes (thioetherification), and hydrodesulfurization. For example, conditions in the first catalytic distillation reactor system 210 may provide for thioetherification and/or hydrogenation of dienes and removal of mercaptan sulfur from the $C_5/C_6$ portion of the hydrocarbon feed. The C5/C6 portion of the naphtha, having a reduced sulfur content as compared to the C5/C6 portion of the feed, may be recovered from catalytic distillation reactor system 210 as a side draw product 216.

An overheads fraction may be recovered from catalytic distillation reactor system 210 via flow line 218, and may contain light hydrocarbons and unreacted hydrogen. The first overheads 218 may be cooled, such as using a heat exchanger 214, and fed to an overhead condenser or collection drum 220. In overhead condenser 220, unreacted hydrogen may be separated from the hydrocarbons contained in the overhead fraction, with unreacted hydrogen withdrawn from overhead condenser 220 via flow line 222. Condensed hydrocarbons may be withdrawn from overhead condenser 220 and fed to first catalytic distillation reactor system 10 as a total or partial reflux via flow line 224 and pump 226.

The C5/C6 side draw product withdrawn from catalytic distillation reactor system 210 via flow line 216 may contain many of the olefins present in the hydrocarbon feed. Additionally, dienes in the C5/C6 cut may be hydrogenated during treatment in catalytic distillation reactor system 210. This hydrogenated, desulfurized C5/C6 side draw product may thus be recovered for use in various processes. In various embodiments, the C5/C6 side draw product may be used as a gasoline blending fraction, hydrogenated and used as a gasoline blending feedstock, and as a feedstock for ethers production, among other possible uses. The particular processing or end use of the C5/C6 fraction may depend upon various factors, including availability of alcohols as a raw material, and the allowable olefin concentration in gasoline for a particular jurisdiction, among others The heavy naphtha, e.g., C6+ boiling range components, including any thioethers formed in reaction zone 212 and various other sulfur compounds contained in the hydrocarbon feed, may be recovered as a bottoms fraction from catalytic distillation reactor system 210 via flow line 16 and fed to catalytic distillation reactor system 10, as described with respect to FIG. 1 and including one or more membrane separation systems 40. As illustrated in FIG. 2, a membrane separation system 40 may be associated with a vapor draw above either or bother of reaction zones 12 and 14.

Figure 3:
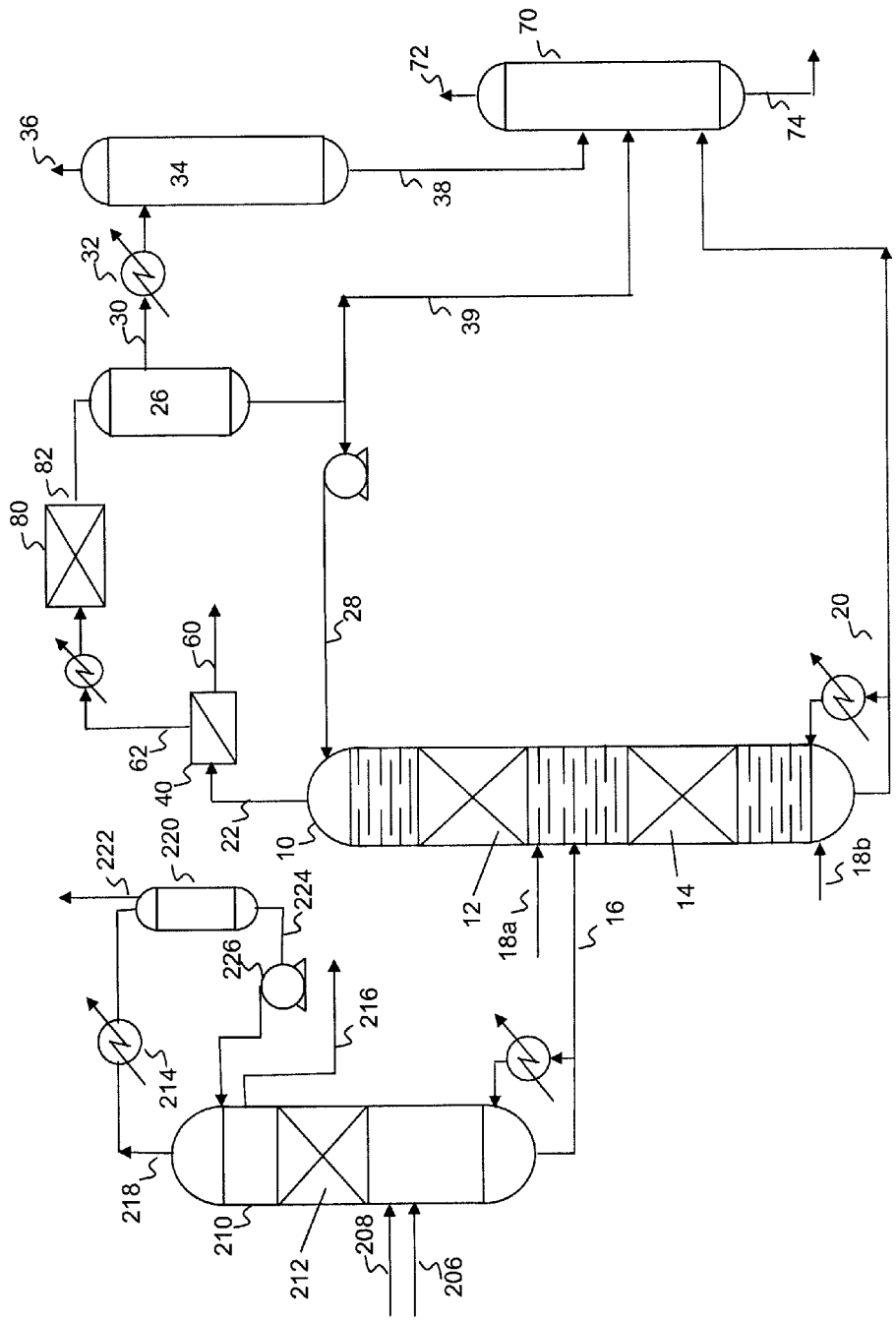
FIG. 3 is a simplified flow diagram of hydrodesulfurization processes according to embodiments disclosed herein.

Referring now to FIG. 3, a simplified flow diagram of a process for hydrodesulfurizing a hydrocarbon feed according to embodiments disclosed herein is illustrated, where like numerals represent like parts. In this embodiment, a naphtha feed is processed in a similar manner as described with respect to FIG. 2 and fed to a catalytic distillation system 10 via flow line 16. In this embodiment, the overhead vapor draw is fed via flow line 22 to a membrane separation system 40. The removal of hydrogen sulfide at this point may essentially stop the recombination reaction at the vapor outlet of catalytic distillation reactor system 10. The overhead fraction, having a reduced concentration of hydrogen sulfide, may then be fed via flow line 62 to a fixed bed hydrodesulfurization reactor 80 to further reduce the mercaptan concentration. The effluent from the fixed bed reactor may then be fed via flow line 82 for separation from hydrogen and hydrogen sulfide using a hot drum 26 and cold drum 34 as described above.

Figure 4:
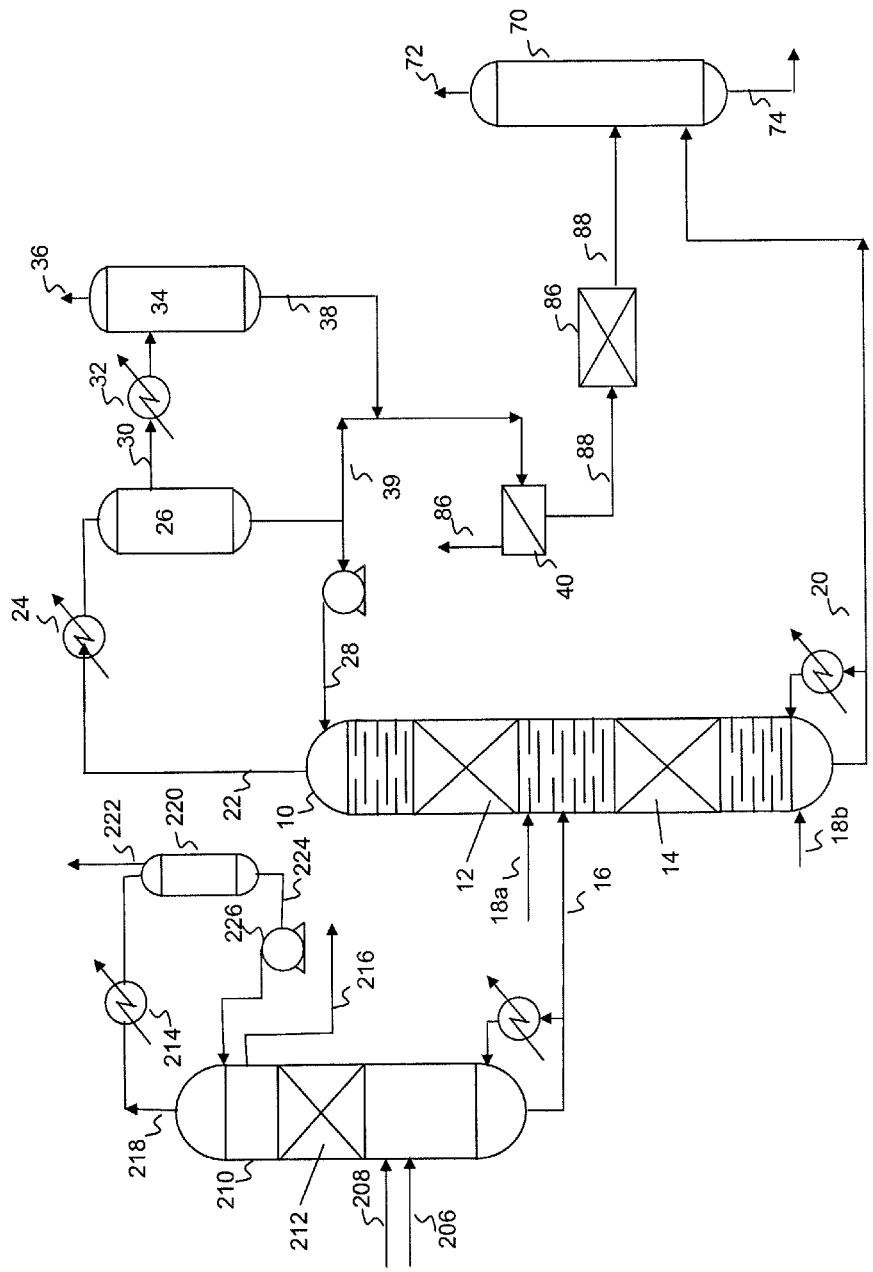
FIG. 4 is a simplified flow diagram of hydrodesulfurization processes according to embodiments disclosed herein.

Referring now to FIG. 4, a simplified flow diagram of a process for hydrodesulfurizing a hydrocarbon feed according to embodiments disclosed herein is illustrated, where like numerals represent like parts. In this embodiment, the membrane separation system 40 is positioned to treat the liquid coming from the hot and cold drums via flow lines 38 and 39, respectively. As most of the hydrogen sulfide is recovered as a vapor from cold drum 34, this configuration may reduce the separation duty in membrane separation system 40 and thus reduce the required membrane area. Hydrogen sulfide may be partitioned across the membrane and recovered via flow line 84. Hydrocarbon liquid, having a reduced hydrogen sulfide concentration, may then be treated in a fixed bed reactor 80 to remove additional mercaptans. The effluent from the fixed bed reactor 80 may then be fed via flow line 82 for separation from hydrogen and hydrogen sulfide using a hot drum 26 and cold drum 34 as described above.

Figure 5A:
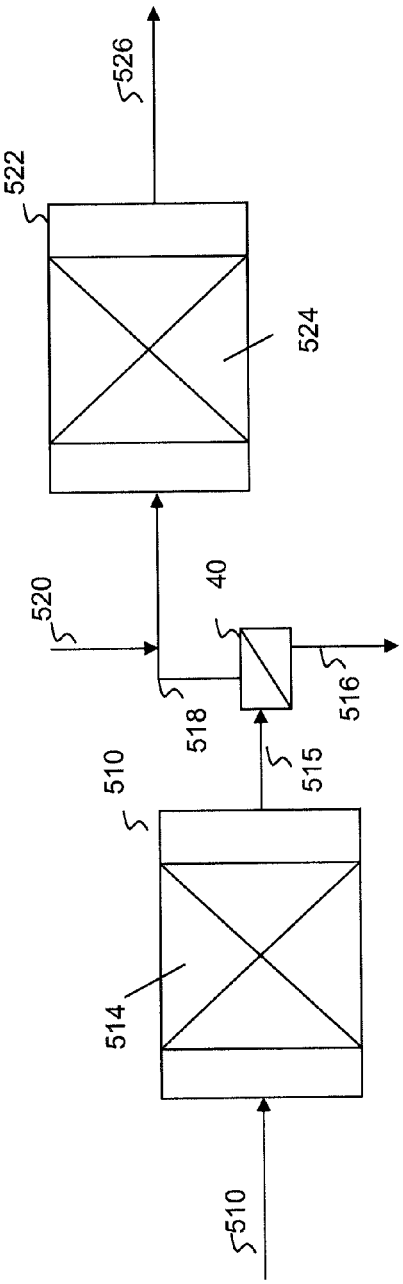
FIGS. 5(A) and 5(B) is a simplified flow diagram of hydrodesulfurization processes according to embodiments disclosed herein.
Figure 5B:
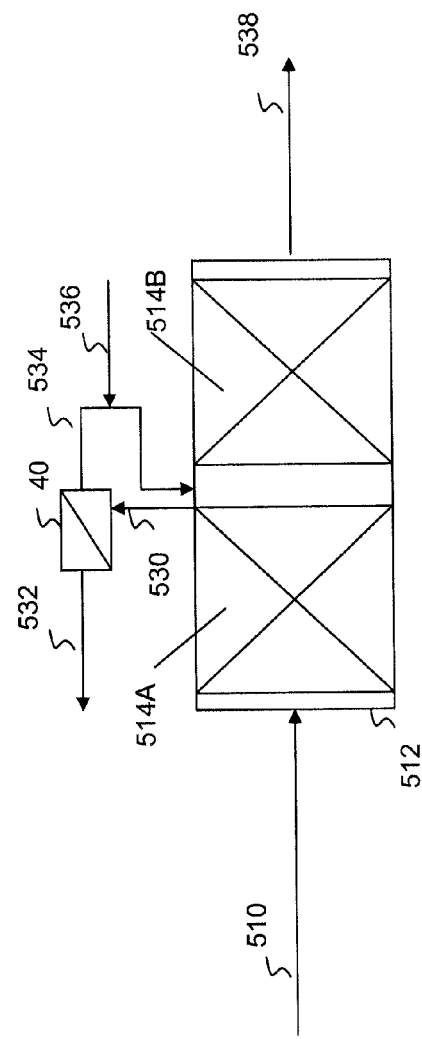

Membrane separation units may also be used according to embodiments herein to decrease recombinant mercaptan formation when processing a hydrocarbon fraction through a fixed bed hydrodesulfurization reactor. Referring now to FIGS. 5A and 5B, simplified flow diagrams of processes or a portion of a processes for hydrodesulfurizing a hydrocarbon feed according to embodiments is illustrated, where like numerals represent like parts.

Referring now to FIG. 5A, hydrogen and a hydrocarbon feed may be fed via flow line 510 to a first fixed bed hydrodesulfurization reactor 512 containing one or more beds 514 of a hydrodesulfurization catalyst. Effluent from fixed bed reactor 512 may be fed via flow line 515 to a membrane separation system 40 to separate hydrogen sulfide, recovered via flow line 516, from the hydrocarbons, recovered via flow line 518. The hydrocarbons may then be fed via flow line 518 along with hydrogen fed via flow line 520 to a second fixed bed reactor 522 containing one or more beds 524 of a hydrodesulfurization catalyst. In alternative embodiments, reactor 522 may be a catalytic distillation reactor system. Effluent from second fixed bed reactor 522 may be recovered via flow line 526 for further processing or separation of hydrogen and hydrogen sulfide from the reactor effluent.

Referring now to FIG. 5B, hydrogen and a hydrocarbon feed may be fed via flow line 510 to a first fixed bed hydrodesulfurization reactor 512 containing two or more beds 514A, 514B of a hydrodesulfurization catalyst. An intermediate reaction effluent, which may be all or a portion of the hydrocarbons exiting bed 514A, may be withdrawn from reactor 510 intermediate beds 514A and 514B via flow line 530. The intermediate effluent may then be fed to a membrane separation system 40 to separate hydrogen sulfide, recovered via flow line 532 from the hydrocarbons, recovered via flow line 534. The hydrocarbons may then be fed via flow line 534 along with hydrogen fed via flow line 536 back to reactor 510 for additional reaction of the hydrocarbons over catalyst bed 514A. Effluent from reactor 512 may be recovered via flow line 538 for further processing or separation of hydrogen and hydrogen sulfide from the reactor effluent.

Figure 6:
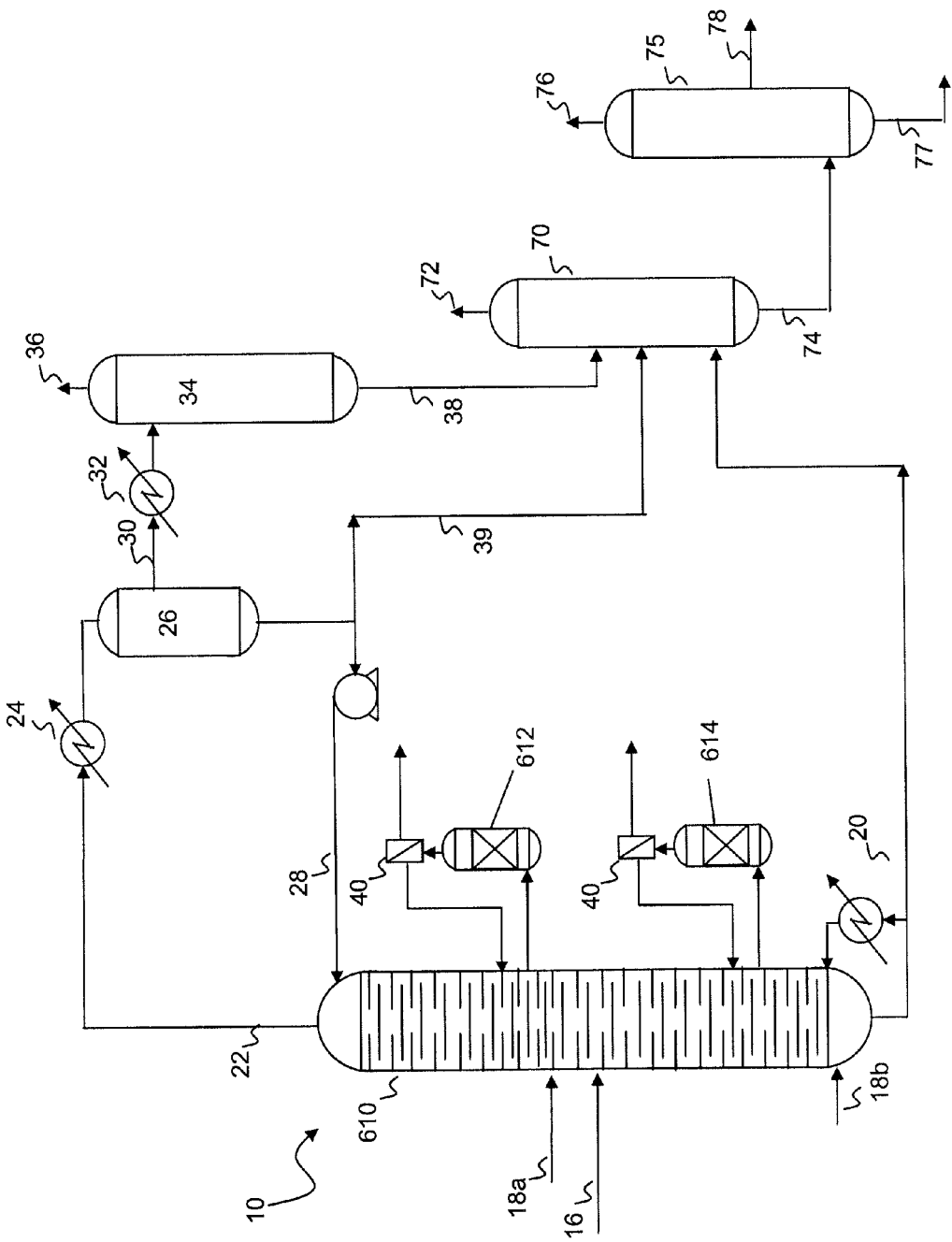
FIG. 6 is a simplified flow diagram of hydrodesulfurization processes according to embodiments disclosed herein.

Referring now to FIG. 6, a simplified flow diagram of a process for hydrodesulfurizing a hydrocarbon feed according to embodiments disclosed herein is illustrated, where like numerals represent like parts. In this embodiment, catalytic distillation reactor system 10 comprises a distillation column 610 combined with at least one side reactor 612, 614, where the side reactor 612, 614 may be operated as a vapor phase reactor, a liquid phase reactor or a boiling point reactor, with concurrent or countercurrent vapor/liquid traffic. As illustrated, side reactors 612 and 614 are upflow liquid or vapor phase reactors, where the effluent from each is fed to a membrane separation system 40 to separate hydrogen sulfide from the hydrocarbons, thus limiting the amount of hydrogen sulfide available in distillation column 610 and the associated overheads system available for formation of recombinant mercaptans.

Figure 7:
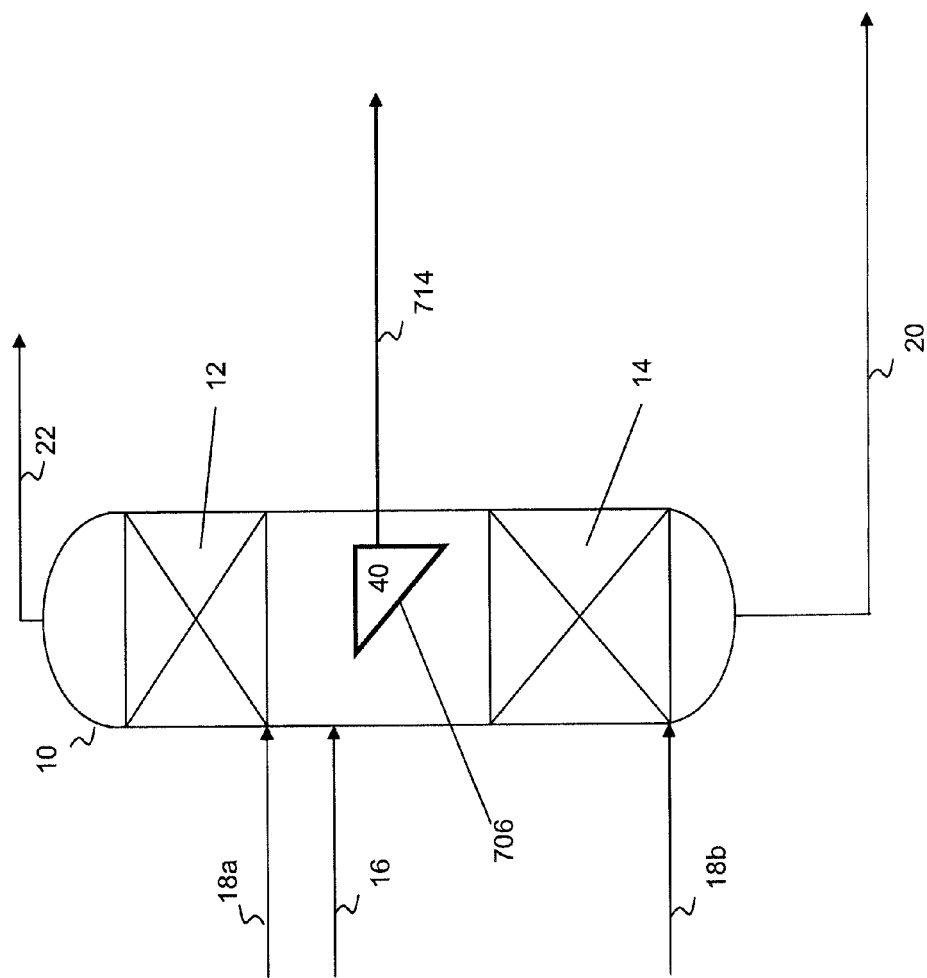
FIG. 7 is a simplified flow diagram of hydrodesulfurization processes according to embodiments disclosed herein.

Referring now to FIG. 7, a simplified flow diagram of a process for hydrodesulfurizing a hydrocarbon feed according to embodiments disclosed herein is illustrated, where like numerals represent like parts. In this embodiment, the membrane separation system 40 is positioned within the catalytic distillation reactor system 10, such as above the catalyst bed 14 located in the stripping section of the column and below the location of hydrocarbon feed 16. The membrane 706 in membrane separation system 40 may allow hydrogen and/or hydrogen sulfide to partition through the membrane 706, retaining hydrocarbon vapors within the column. The hydrogen and/or hydrogen sulfide may then be recovered via flow line 714. The membrane 714 may be sized and positioned to receive full or partial vapor traffic, and downcomers or other liquid flow devices (not shown) may be used to maintain liquid traffic between the upper and lower portions of the column 10.

When the membrane separation system 40 is located within the catalytic distillation reactor system, the membrane size and material of construction may be appropriately selected such that the membrane has a cycle life matching that of the catalyst(s) located within the reaction zones in the column. In this manner, replacement of both the catalyst and the membrane may occur at the same time.

In a catalytic distillation reactor system, such as catalytic distillation reactor 210, the naphtha feed may be concurrently fractionated and hydrogenated. The conditions in a reaction distillation zone of a first catalytic distillation reactor system are: temperatures in the range from 260° F. to 400° F., total pressure in the range from 75 to 300 psig, hydrogen partial pressure in the range from 6 to 75 psia, WHSV of naphtha in the range from about 1 to 5, and hydrogen feed rates in the range from 10 to 1000 scf/bbl. The conditions in the first catalytic distillation reactor system allow for hydrogenation of dienes and removal of mercaptan sulfur via thioetherification (reaction of mercaptan with a diene).

Conditions in a reaction distillation zone of a second catalytic distillation reactor system, such as a catalytic distillation reactor 10, are: temperatures in the range from 300° F. to 800° F., total pressure in the range from 75 to 300 psig, hydrogen partial pressure in the range from 6 to 75 psia, WHSV of naphtha in the range from about 1 to 5, and hydrogen feed rates in the range from 10 to 1000 scf/bbl. The conditions in the second catalytic distillation reactor system allow for selective desulfurization of alcohols to a concentration of between about 30 to 120 ppm sulfur.

As described above, processes disclosed herein may additionally treat a naphtha or gasoline fraction, or a select portion thereof, in one or more fixed bed reactor systems. Each fixed bed reactor system may include one or more reactors in series or parallel, each reactor having one or more reaction zones containing one or more hydrodesulfurization catalysts. Such fixed bed reactors may be operated as a vapor phase reactor, a liquid phase reactor, or a mixed phase (V/L) reactor and may include traditional fixed bed reactors, trickle bed reactors, pulse flow reactors, and other reactor types known to those skilled in the art. The operating conditions used in the fixed bed reactor systems may depend upon the reaction phase(s), the boiling range of the naphtha fraction being treated, catalyst activity, selectivity, and age, and the desired sulfur removal per reaction stage, and the target sulfur compounds, among other factors.

Catalysts in the first catalytic distillation reactor column may be characterized as thioetherification catalysts or alternatively hydrogenation catalysts. In the first catalytic distillation reactor column, reaction of the diolefins with the sulfur compounds is selective over the reaction of hydrogen with olefinic bonds. The preferred catalysts are palladium and/or nickel or dual bed as shown in U.S. Pat. No. 5,595,643, which is incorporated herein by reference, since in the first catalytic distillation reactor column the sulfur removal is carried out with the intention to preserve the olefins. Although the metals are normally deposited as oxides, other forms may be used. The nickel is believed to be in the sulfide form during the hydrogenation.

Another suitable catalyst for the thioetherification reaction may be 0.34 wt % Pd on 7 to 14 mesh alumina spheres, supplied by Sud-Chemie, designated as G-68C. The catalyst also may be in the form of spheres having similar diameters. They may be directly loaded into standard single pass fixed bed reactors which include supports and reactant distribution structures. However, in their regular form they form too compact a mass for operation in a catalytic distillation reactor system column and must then be prepared in the form of a catalytic distillation structure. The catalytic distillation structure must be able to function as catalyst and as mass transfer medium. The catalyst must be suitably supported and spaced within the column to act as a catalytic distillation structure. Generally the mole ratio of hydrogen to diolefins and acetylenes in the feed is at least 1.0 to 1.0 and preferably 2.0 to 1.0.

In second and subsequent catalytic distillation reactor columns and catalytic reaction zones, it may be the purpose of the catalyst to destroy the sulfur compounds to produce a hydrocarbon stream containing hydrogen sulfide, which is easily separated from the heavier components therein. Hydrogen and hydrogen sulfide may be separated from heavy hydrocarbon components in a stripping column, as described above. The focus of these catalytic reactions that occur after the first catalytic distillation reactor column is to carry out destructive hydrogenation of the sulfides and other organic sulfur compounds.

Catalysts useful as the hydrodesulfurization catalyst in the reaction zones of the respective catalytic distillation reactor systems may include Group VIII metals, such as cobalt, nickel, palladium, alone or in combination with other metals, such as molybdenum or tungsten, on a suitable support, which may be alumina, silica-alumina, titania-zirconia or the like. Normally the metals are provided as the oxides of the metals supported on extrudates or spheres and as such are not generally useful as distillation structures. Alternatively, catalyst may be packaged in a suitable catalytic distillation structure, which characteristically can accommodate a wide range of typically manufactured fixed bed catalyst sizes.

The catalysts may contain components from Group V, VIB, VIII metals of the Periodic Table or mixtures thereof. The incorporation of the distillation column reactor systems may reduce the deactivation of catalysts and may provide for longer runs than the fixed bed hydrogenation reactors of the prior art. The Group VIII metal may also provide increased overall average activity. Catalysts containing a Group VIB metal, such as molybdenum, and a Group VIII metal, such as cobalt or nickel, are preferred. Catalysts suitable for the hydrodesulfurization reaction include cobalt-molybdenum, nickel-molybdenum and nickel-tungsten. The metals are generally present as oxides supported on a neutral base such as alumina, silica-alumina or the like. The metals are reduced to the sulfide either in use or prior to use by exposure to sulfur compound containing streams and hydrogen.

The catalyst may also catalyze the hydrogenation of the olefins and polyolefins contained within the light cracked naphtha and to a lesser degree the isomerization of some of the mono-olefins. The hydrogenation, especially of the mono-olefins in the lighter fraction, may not be desirable.

The catalyst typically is in the form of extrudates having a diameter of 1/8, 1/16 or 1/32 inches and an L/D of 1.5 to 10. The catalyst also may be in the form of spheres having similar diameters. They may be directly loaded into standard single pass fixed bed reactors which include supports and reactant distribution structures. However, in their regular form they form too compact a mass for operation in the catalytic distillation reactor system column and must then be prepared in the form of a catalytic distillation structure. As described above, the catalytic distillation structure must be able to function as catalyst and as mass transfer medium. The catalyst must be suitably supported and spaced within the column to act as a catalytic distillation structure.

In some embodiments, the catalyst is contained in a structure as disclosed in U.S. Pat. No. 5,730,843, which is hereby incorporated by reference. In other embodiments, catalyst is contained in a plurality of wire mesh tubes closed at either end and laid across a sheet of wire mesh fabric such as demister wire. The sheet and tubes are then rolled into a bale for loading into the distillation column reactor. This embodiment is described, for example, in U.S. Pat. No. 5,431,890, which is hereby incorporated by reference. Other useful catalytic distillation structures are disclosed in U.S. Pat. Nos. 4,731,229, 5,073,236, 5,431,890 and 5,266,546, which are each incorporated by reference.

Hydrodesulfurization catalysts described above with relation to the operation of the catalytic distillation reactor systems may also be used in the fixed bed catalytic reactors. In selected embodiments, catalysts used in the fixed bed catalytic reactors may include hydrodesulfurization catalysts that only promote the desulfurization of mercaptan species, which are among the easiest to convert to hydrogen sulfide. Conditions in the fixed bed catalytic reactors, including high temperature and high hydrogen mole fractions, are conducive to olefin saturation. For preservation of olefin content and conversion of mercaptans to hydrogen sulfide at these conditions, suitable catalysts may include nickel catalysts with very low molybdenum promotion, or no promoters at all, and molybdenum catalysts with very low copper promotion, or no promoters at all. Such catalysts may have lower hydrogenation activity, promoting the desulfurization of the mercaptan species without significant loss of olefins.

In some embodiments, the catalytic distillation reactor systems described above may contain one or more hydrodesulfurization reaction zones. For such systems containing only one reaction zone, the reaction zone should be located in the rectification portion of the column, contacting the light portion of the feed with the hydrodesulfurization catalyst. Hydrodesulfurization of the heavy fraction may occur in the catalytic distillation reactor systems, such as where a reaction zone is additionally located in the stripping portion of the column. Optionally, the heavy portion may be hydrodesulfurized in a stand alone reactor, such as a fixed bed reactor containing a hydrodesulfurization catalyst.

After treatment according to the processes described herein, the sulfur content of the hydrodesulfurized naphtha fractions (i.e., one or more of flow lines 20, 38, 39, 74, 76, 77, and 78) may be less than about 50 ppm in some embodiments; less than 40 ppm in other embodiments; less than 30 ppm in other embodiments; less than 20 ppm in other embodiments; less than 10 ppm in other embodiments; less than 5 ppm in other embodiments; and less than 1 ppm in yet other embodiments, where each of the above are based on weight.

In contrast to typical hydrodesulfurization processes, which often use harsh operating conditions to reduce sulfur content, resulting in significant loss of olefins, desulfurized products resulting from the processes disclosed herein may retain a significant portion of the olefins, resulting in a higher value end product. In some embodiments, products resulting from the processes described herein may have an overall olefins concentration ranging from 5 to 55 weight percent; from about 10 to about 50 weight percent in other embodiments; and from about 20 to about 45 weight percent in other embodiments. As compared to the initial hydrocarbon feed (flow line 8) the overall product streams recovered from embodiments disclosed herein (including flow lines 16, 94, 82, and 84 as appropriate for the respective embodiments) may retain at least 25% of the olefins in the initial hydrocarbon feed; at least 30% of the olefins in the initial hydrocarbon feed in other embodiments; at least 35% of the olefins in the initial hydrocarbon feed in other embodiments; at least 40% of the olefins in the initial hydrocarbon feed in other embodiments; at least 45% of the olefins in the initial hydrocarbon feed in other embodiments; at least 50% of the olefins in the initial hydrocarbon feed in other embodiments; and at least 60% of the olefins in the initial hydrocarbon feed in other embodiments.

As described above, embodiments disclosed herein advantageously use a membrane separation system to selectively separate hydrogen sulfide from hydrocarbon liquid or vapor process streams. Selective removal of hydrogen sulfide from these process streams may provide for a reduced mercaptan content in a desulfurized naphtha product stream. It is an advantage of embodiments disclosed herein that hydrogen sulfide is separated at select stages of the process to reduced recombinant mercaptan formation as a result of a reduced hydrogen sulfide concentration following membrane separations. It is a further advantage that the separation of the hydrogen sulfide may take place as an intermediate step during hydrotreating, increasing the selective conversion of sulfur compounds to produce a low sulfur gasoline product. In particular embodiments, it is particularly advantageous that the membrane separations may be conducted at hydrodesulfurization temperatures, such as greater than about 300° F.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A process for the hydrodesulfurization of gasoline, the process comprising:
feeding (1) a cracked naphtha containing mercaptans and other organic sulfur compounds and (2) hydrogen to a hydrodesulfurization reactor containing one or more beds of a hydrodesulfurization catalyst;
contacting sulfur compounds comprising the other organic sulfur compounds in the cracked naphtha with hydrogen in the presence of a hydrodesulfurization catalyst to convert a portion of the other organic sulfur compounds to hydrogen sulfide;

withdrawing from the hydrodesulfurization reactor an effluent comprising hydrocarbons, hydrogen sulfide, and optionally hydrogen;

feeding the effluent to a membrane separation system containing a membrane for separating at least a portion of the hydrogen sulfide from the hydrocarbons to recover a hydrocarbon fraction having a reduced hydrogen sulfide content.

2. The process of claim 1, wherein the separation across the membrane is conducted at a temperature in a range from about 300° F. to about 800° F.

3. The process of claim 1, wherein the separation across the membrane is conducted at a temperature in a range from about 500° F. to about 700° F.

4. The process of claim 1, wherein the membrane separation system comprises one or more membranes selected from the group consisting of:
   a. a membrane selective to hydrogen sulfide to separate a permeate fraction comprising hydrogen sulfide and optionally hydrogen from a residue fraction comprising the hydrocarbons;
   b. a membrane selective to hydrocarbons to separate a permeate fraction comprising the hydrocarbons from a residue fraction comprising the hydrogen sulfide and optionally hydrogen;
   c. a membrane selective to hydrogen to separate a permeate fraction comprising hydrogen and a residue fraction comprising hydrogen sulfide;
   d. a membrane selective to hydrogen to separate a permeate fraction comprising hydrogen and a residue fraction comprising hydrogen sulfide and hydrocarbons.

5. The process of claim 1, wherein the effluent is withdrawn intermediate two reaction zones contained in the first hydrodesulfurization reactor, the process further comprising returning the hydrocarbon fraction having a reduced hydrogen sulfide content to the first hydrodesulfurization reactor intermediate the two reaction zones.

6. The process of claim 1, further comprising feeding the hydrocarbon fraction having a reduced hydrogen sulfide content to a second hydrodesulfurization reactor containing a hydrodesulfurization catalyst.

7. A process for the hydrodesulfurization of gasoline comprising the steps of:
   feeding (1) a cracked naphtha containing mercaptans and other organic sulfur compounds and (2) hydrogen to a catalytic distillation reactor system having one or more reaction zones containing a hydrodesulfurization catalyst;
   concurrently in the catalytic distillation reactor system,
      (i) reacting at least a portion of the mercaptans and other organic sulfur compounds in the cracked naphtha with hydrogen in the presence of the hydrodesulfurization catalyst to convert a portion of the mercaptans and other organic sulfur compounds to hydrogen sulfide, and
      (ii) separating the cracked naphtha into a light naphtha fraction and a heavy naphtha fraction;
   recovering the light naphtha fraction, unreacted hydrogen, and hydrogen sulfide from the catalytic distillation reactor system as an overheads vapor fraction;
   recovering the heavy naphtha fraction from the catalytic distillation reactor system as a bottoms fraction;
   feeding at least a portion of a vapor draw comprising hydrocarbons, hydrogen sulfide, and optionally hydrogen from the catalytic distillation reactor system, inclusive of the overheads vapor fraction, to a membrane separation system containing a membrane for separating at least a portion of the hydrogen sulfide from the hydrocarbons to recover a hydrocarbon fraction having a reduced hydrogen sulfide content.

8. The process of claim 7, wherein the separation across the membrane is conducted at a temperature in a range from about 300° F. to about 800° F.

9. The process of claim 7, wherein the separation across the membrane is conducted at a temperature in a range from about 500° F. to about 700° F.

10. The process of claim 7, wherein the membrane separation system comprises one or more membranes selected from the group consisting of:
    a. a membrane selective to hydrogen sulfide to separate a permeate fraction comprising hydrogen sulfide and optionally hydrogen from a residue fraction comprising the hydrocarbons;
    b. a membrane selective to hydrocarbons to separate a permeate fraction comprising the hydrocarbons from a residue fraction comprising the hydrogen sulfide and optionally hydrogen;
    c. a membrane selective to hydrogen to separate a permeate fraction comprising hydrogen and a residue fraction comprising hydrogen sulfide;
    d. a membrane selective to hydrogen to separate a permeate fraction comprising hydrogen and a residue fraction comprising hydrogen sulfide and hydrocarbons.

11. The process of claim 7, further comprising feeding the residue fraction to a second hydrodesulfurization reactor having one or more reaction zones containing a hydrodesulfurization catalyst, wherein the second hydrodesulfurization reactor comprises at least one of a fixed bed reactor and a second catalytic distillation reactor system.

12. The process of claim 7, wherein the vapor draw is withdrawn intermediate two reaction zones of the catalytic distillation reactor system, the process further comprising returning the hydrocarbon fraction having a reduced hydrogen sulfide content to the catalytic distillation reactor system intermediate the two reaction zones.

13. The process of claim 7, further comprising:
    partially condensing the overheads vapor fraction and separating the uncondensed portion of the overheads including unreacted hydrogen and hydrogen sulfide from the condensed portion of the overheads fraction;
    feeding at least a portion of the condensed portion of the overheads fraction to the catalytic distillation reactor system as reflux;
    cooling the uncondensed portion of the overheads fraction to condense additional hydrocarbons and separating the cooled portion to recover a vapor fraction comprising unreacted hydrogen and hydrogen sulfide and a liquid hydrocarbon fraction;
    feeding at least one of the liquid hydrocarbon fraction and a non-reflux portion of the condensed portion to the membrane separation system as the at least a portion of a vapor draw.

14. The process of claim 13, further comprising:
    feeding the hydrocarbon fraction having a reduced hydrogen sulfide content to a fixed bed reactor having one or more reaction zones containing a hydrodesulfurization catalyst;
    contacting the hydrocarbon fraction having a reduced hydrogen sulfide content with hydrogen in the presence of the hydrodesulfurization catalyst to convert at least a portion of any mercaptans and other organic sulfur compounds present to from hydrogen sulfide; and feeding an effluent from the fixed bed reactor and the heavy naphtha fraction to a stripper;

separating unreacted hydrogen and hydrogen sulfide from the effluent and the heavy naphtha fraction to recover unreacted hydrogen and hydrogen sulfide as a vapor fraction and to recover a combined naphtha fraction as a liquid fraction from the stripper.

15. The process of claim 14, further comprising separating the vapor fraction to recover a second hydrogen fraction having a reduced hydrogen sulfide content and recycling at least a portion of the second hydrocarbon fraction to at least one of the catalytic distillation reactor system and the fixed bed reactor.

16. A process for the hydrodesulfurization of gasoline comprising the steps of:

feeding (1) a full boiling range cracked naphtha containing olefins, diolefins, mercaptans and other organic sulfur compounds and (2) hydrogen to a first catalytic distillation reactor system;

concurrently in the first catalytic distillation reactor system,
 (i) contacting the diolefins and the mercaptans in the cracked naphtha in the presence of a Group VIII metal catalyst in the rectification section of the first catalytic distillation reactor system thereby reacting:
  (A) a portion of the mercaptans with a portion of the diolefins to form thioethers,
  (B) a portion of the mercaptans with a portion of the hydrogen to form hydrogen sulfide; or
  (C) a portion of the diolefins with a portion of the hydrogen to form olefins; and
  (D) a combination of one or more of (A), (B), and (C); and
 (ii) fractionating the full boiling range cracked naphtha into a distillate product containing C5 hydrocarbons and a first heavy naphtha containing sulfur compounds;

recovering the first heavy naphtha from the first catalytic distillation reactor system as a first bottoms;

feeding the first bottoms and hydrogen to a second catalytic distillation reactor system having one or more reaction zones containing a hydrodesulfurization catalyst;

concurrently in the second catalytic distillation reactor system,
 (i) reacting at least a portion of the mercaptans and other organic sulfur compounds in the first bottoms with hydrogen in the presence of the hydrodesulfurization catalyst to convert a portion of the mercaptans and other organic sulfur compounds to hydrogen sulfide, and
 (ii) separating the first bottoms into a light naphtha fraction and a heavy naphtha fraction;

recovering the light naphtha fraction, unreacted hydrogen, and hydrogen sulfide from the second catalytic distillation reactor system as an overheads vapor fraction;

recovering the heavy naphtha fraction from the second catalytic distillation reactor system as a bottoms fraction;

feeding at least a portion of a vapor draw comprising hydrocarbons, hydrogen sulfide, and optionally hydrogen from the second catalytic distillation reactor system, inclusive of the overheads vapor fraction, to a membrane separation system containing a membrane for separating at least a portion of the hydrogen sulfide from the hydrocarbons to recover a hydrocarbon fraction having a reduced hydrogen sulfide content.

17. The process of claim 16, wherein the separation across the membrane is conducted at a temperature in a range from about 300° F. to about 800° F.

18. The process of claim 16, wherein the separation across the membrane is conducted at a temperature in a range from about 500° F. to about 700° F.

19. The process of claim 16, wherein the membrane separation system comprises one or more membranes selected from the group consisting of:
 a. a membrane selective to hydrogen sulfide to separate a permeate fraction comprising hydrogen sulfide and optionally hydrogen from a residue fraction comprising the hydrocarbons;
 b. a membrane selective to hydrocarbons to separate a permeate fraction comprising the hydrocarbons from a residue fraction comprising the hydrogen sulfide and optionally hydrogen;
 c. a membrane selective to hydrogen to separate a permeate fraction comprising hydrogen and a residue fraction comprising hydrogen sulfide;
 d. a membrane selective to hydrogen to separate a permeate fraction comprising hydrogen and a residue fraction comprising hydrogen sulfide and hydrocarbons.

20. The process of claim 16, further comprising feeding the hydrocarbon fraction having a reduced hydrogen sulfide content to a third hydrodesulfurization reactor having one or more reaction zones containing a hydrodesulfurization catalyst, wherein the third hydrodesulfurization reactor comprises at least one of a fixed bed reactor and a second catalytic distillation reactor system.

21. The process of claim 16, wherein the vapor draw is withdrawn intermediate two reaction zones of the second catalytic distillation reactor system, the process further comprising returning the hydrocarbon fraction having a reduced hydrogen sulfide content to the catalytic distillation reactor system intermediate the two reaction zones.

22. The process of claim 16, further comprising;

partially condensing the overheads vapor fraction and separating the uncondensed portion of the overheads including unreacted hydrogen and hydrogen sulfide from the condensed portion of the overheads fraction;

feeding at least a portion of the condensed portion of the overheads fraction to the catalytic distillation reactor system as reflux;

cooling the uncondensed portion of the overheads fraction to condense additional hydrocarbons and separating the cooled portion to recover a vapor fraction comprising unreacted hydrogen and hydrogen sulfide and a liquid hydrocarbon fraction;

feeding at least one of the liquid hydrocarbon fraction and a non-reflux portion of the condensed portion to the membrane separation system as the at least a portion of a vapor draw.

23. The process of claim 22, further comprising:

feeding the hydrocarbon fraction having a reduced hydrogen sulfide content to a fixed bed reactor having one or more reaction zones containing a hydrodesulfurization catalyst;

contacting the hydrocarbon fraction having a reduced hydrogen sulfide content with hydrogen in the presence of the hydrodesulfurization catalyst to convert at least a portion of any mercaptans and other organic sulfur compounds present to from hydrogen sulfide; and feeding an effluent from the fixed bed reactor and the heavy naphtha fraction to a stripper;

separating unreacted hydrogen and hydrogen sulfide from the effluent and the heavy naphtha fraction to recover unreacted hydrogen and hydrogen sulfide as a vapor fraction and to recover a combined naphtha fraction as a liquid fraction from the stripper.

24. The process of claim 23, further comprising separating the vapor fraction to recover a second hydrogen fraction having a reduced hydrogen sulfide content and recycling at least a portion of the second hydrocarbon fraction to at least one of the catalytic distillation reactor system and the fixed bed reactor.

25. A process for the hydrodesulfurization of gasoline comprising the steps of:

feeding (1) a cracked naphtha containing mercaptans and other organic sulfur compounds and (2) hydrogen to a first catalytic distillation reactor system having one or more reaction zones containing a hydrodesulfurization catalyst;

concurrently in the catalytic distillation reactor system,
(i) reacting at least a portion of the mercaptans and other organic sulfur compounds in the cracked naphtha with hydrogen in the presence of the hydrodesulfurization catalyst to convert a portion of the mercaptans and other organic sulfur compounds to hydrogen sulfide, (ii) separating the cracked naphtha into a light naphtha fraction and a heavy naphtha fraction; and (iii) contacting a portion of vapor comprising hydrocarbons, hydrogen, and hydrogen sulfide with a membrane separation system located within the column, the membrane separation system containing a membrane for separating at least a portion of the hydrogen sulfide from the hydrocarbons;

recovering the light naphtha fraction, unreacted hydrogen, and hydrogen sulfide from the catalytic distillation reactor system as an overheads vapor fraction;

recovering the heavy naphtha fraction from the catalytic distillation reactor system as a bottoms fraction;

recovering a hydrogen sulfide fraction from the membrane separation system.

26. The process of claim 25, wherein the separation across the membrane is conducted at a temperature in a range from about 300° F. to about 800° F.

27. The process of claim 25, wherein the separation across the membrane is conducted at a temperature in a range from about 500° F. to about 700° F.

* * * * *